United States Patent [19]
Rehrig

[11] Patent Number: 5,403,987
[45] Date of Patent: Apr. 4, 1995

[54] GAS SHIELDED WELDING TORCH

[76] Inventor: Richard B. Rehrig, P.O. Box 1870, San Marcos, Calif. 92079

[21] Appl. No.: 214,836

[22] Filed: Mar. 17, 1994

[51] Int. Cl.$^6$ .............................................. B23K 9/29
[52] U.S. Cl. .................... 219/75; 219/137.51
[58] Field of Search ...................... 219/75, 137.51, 136

[56] References Cited

U.S. PATENT DOCUMENTS

| | | | |
|---|---|---|---|
| 2,555,017 | 5/1951 | Tuthill | 219/75 |
| 2,817,749 | 12/1957 | Flood et al. | 219/130.51 |
| 2,943,183 | 6/1960 | Simms et al. | |
| 3,158,730 | 11/1964 | Hill. | |
| 3,197,611 | 7/1965 | Morris et al. | |
| 3,703,622 | 11/1972 | Kleppen, Jr. | |
| 3,755,648 | 8/1973 | Rothman et al. | 219/137.51 |
| 3,836,747 | 9/1974 | Wlos | 219/137.51 |
| 3,909,585 | 9/1975 | Sanders et al. | |
| 3,999,033 | 12/1976 | Willgohs et al. | 219/75 |
| 4,145,595 | 3/1979 | Keller et al. | |
| 5,166,496 | 11/1992 | Sarkissian | 219/137.51 |

*Primary Examiner*—Clifford C. Shaw
*Attorney, Agent, or Firm*—Lyon & Lyon

[57] ABSTRACT

An improved gas shielded welding torch having a head portion adopted to retain a tungsten electrode therein and flexible handle portion which supplies electric current and inert shielding gas to the head portion. The handle portion includes a bendable metal helix of solid wire therein which defines an electrically conductive path through the handle portion and renders the handle portion readily bendable so that the torch head can be positioned in any desired angular orientation with respect thereto to facilitate access to the work area. A torch body of elastomeric insulating material is molded about the helix and adjacent portions of the torch handle. To prevent the elastomeric material from intruding into the bore of the helix during the molding of the insulating body and plugging the gas flow passage defined hereby and from intruding into the spaces between the convulsions in the helix and preventing the individuals convolutions from freely opening and closing during bending of the torch body, the helix is wrapped with sealing tape and is thereby isolated during the molding of the insulating body. The resulting uniform flexibility in the helix uninhibited by intruding insulating material improves the versatility of the torch and avoids repetitive bending in areas of least resistance along the helix, which would otherwise exist in an obstructed coil and cause localized work hardening and premature failure. The sealing tape also defines a second layer of thermal and electrical insulation for the protection of the operator.

6 Claims, 2 Drawing Sheets

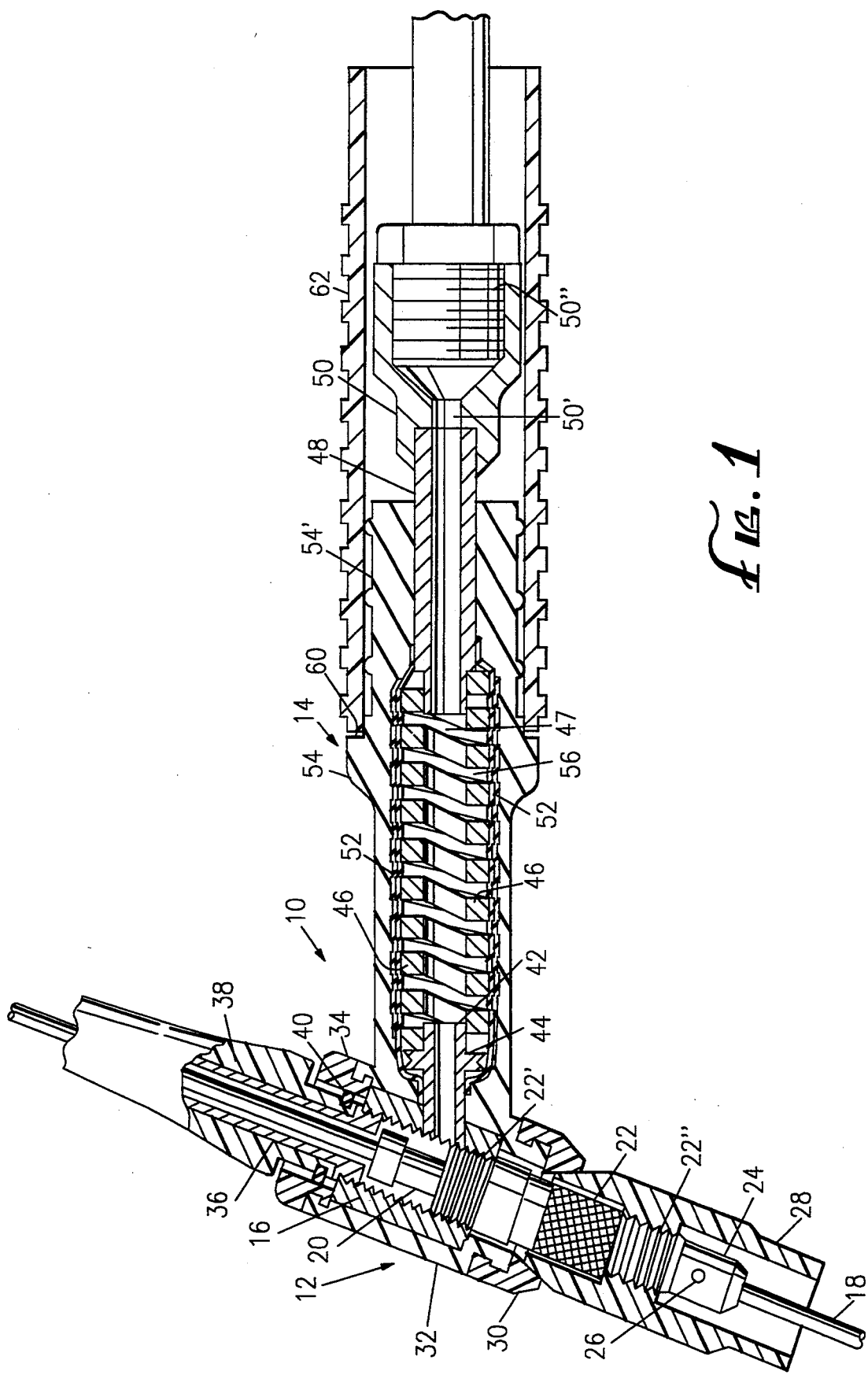

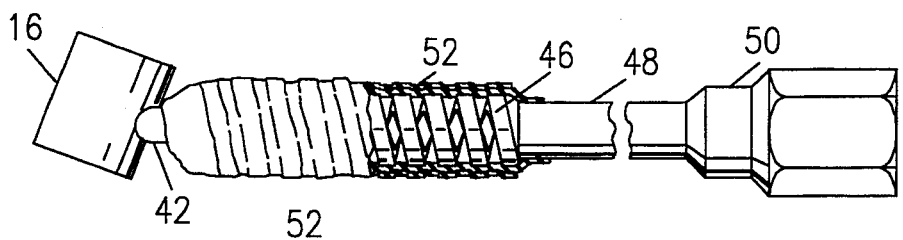
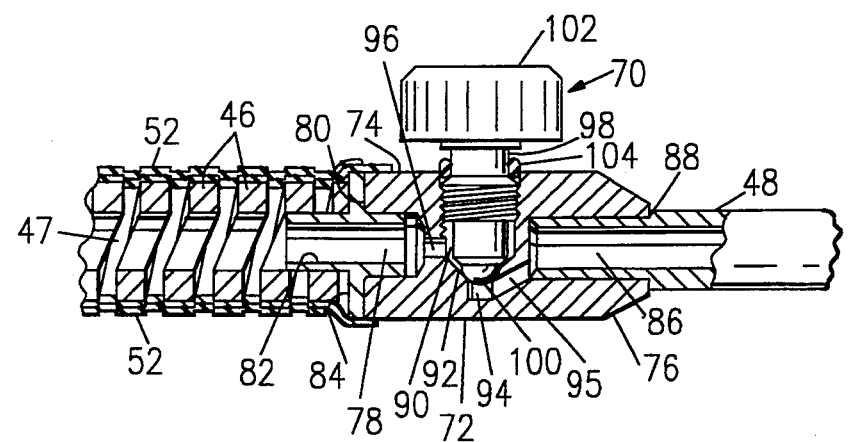

GAS SHIELDED WELDING TORCH

BACKGROUND OF THE INVENTION

The present invention relates to welding torches and more particularly gas shielded tungsten-arc welding torches, commonly referred to in the trade as TIG torches. The designation TIG refers to tungsten inert gas. TIG welding is an arc welding process originally developed to weld corrosion resistant and difficult to weld metals, such as aluminum and magnesium. The necessary heat for gas tungsten-arc welding is produced by a highly concentrated arc maintained between a non-consumable tungsten electrode and the workpiece to be welded which permits pinpoint control of the heat resulting in a narrow heat affected zone. This is obviously advantageous when welding metals that possess high heat conductivity, such as aluminum and copper. The weld zone, the molten metals and the tungsten electrode are shielded from the atmosphere by a blanket of inert gas such as argon or helium which is fed through the electrode holder. This inert shielding gas surrounding the weld zone serves to blanket the weld and exclude the active properties in the surrounding air thereby preventing oxidation of the electrode, the weld puddle and the weld zone.

While TIG torches are highly versatile in that they are capable of welding all types of metals, their rigid configurations have made their use quite difficult in many work areas of limited or difficult access. As a result, different torches have been provided with different head configurations for use in such areas. For example, one torch with a given head configuration may emit the arc at an angle of about 70 degrees with respect to the handle, another at 90 degrees with respect to the handle, and yet another torch would emit an arc in axial alignment with the torch handle. To utilize this form of flexibility, however, is somewhat time consuming and it is necessary to maintain several different torches of varying head configurations which is very expensive. An attempted solution to this problem is found in U.S. Pat. No. 2,949,526, wherein a body portion of the torch was made removable from the torch handle. However, this approach did little to remedy the situation as the removable body not only comprised the head portion of the torch, but most of the remaining elements as well. Consequently, to maintain an inventory of TIG torch body portions with different head configurations is almost as costly as maintaining an inventory of torches.

Another attempt to increase the versatility of gas shielded welding torches is found in U.S. Pat. No. 4,145,595 wherein the torch body is constructed so as to be bendable so that the torch head can be positioned in any desired angular orientation with respect thereto to access the work area. To provide such flexibility, a double helix formed by a pair of side-by-side coils of flexible conductive wire each cylindrical in cross-section is provided between the torch handle and the torch head. The coils electrically and structurally connect the torch head with the torch handle while the interior central bore thereof defines a gas supply conduit to the torch head. A cylindrical body of an elastomeric insulating material is molded about the helix and adjacent coupling members such that the insulating material is interposed between and adhered to the convolutions of the helix. The patent states that by embedding the helix in the body of insulating material, the displacement of the metal coils is limited, minimizing the work hardening of the helix and prolonging its useful life. It has been found, however, that because the encapsulating of the helix in the insulating material is done by a molding operation that requires heat and pressure for the insulating material (usually silicone rubber), the insulating material is forced by the molding pressure into all of the available open areas within the component assembly. As a result, the insulating rubber is forced down between the convolutions of the helix and into the internal gas supply conduit formed by the bore of helix, reducing the ability of the coils to flex and plugging or partially plugging the internal gas conduit. Plugging of the conduit is avoided with the use of a removable rod which extends through the helix during the molding process to prevent the insulating material from entering the spaces between the convolutions of the helix. After the insulating material is cured, the rod is removed. Such a process requires relatively expensive tooling, increasing the costs of manufacture and exacerbates the flexibility problem resulting from filling the areas of the helix between the convulsions with insulating material.

With the rod in place to prevent entry of the insulating rubber into the bore of the helix, the insulating rubber is tightly packed between the convolutions of the helix and, by design, bonds thereto. The metal component surfaces of the assembly are treated by sand blasting or by similar cleaning action to achieve this bonding and maximize the adhesion of the rubber insulation thereto. As a result, not only are the individual coils in the helix prevented by the interposed rubber from freely opening and closing as intended to provide flexibility, the flexibility in the system is, in effect, provided almost solely by rubber material between the coils.

As the user bends the torch handle, the coils in the area of bending and the attached adjacent rubber form a radius of curvature. As these coils and surrounding insulation in the handle are bent, rubber insulating material between the coils at the outside of the formed radius of curvature is stretched while the material at the inside of the radius is compressed. The stretched and compressed rubber insulating material thus tends to straighten the helix making the desired torch head orientation more difficult to achieve. More significantly, the individual coils in the helix are not perfectly symmetrical and the spacing between the individual coils will vary. As the bending tends to occur at the point of least resistance, the assembly will tend to bend repetitively in the areas of the helix with the most rubber between the coils, creating localized stresses in the helix and causing the repetitively bent coils to work harden and prematurely fail. Further, as the rubber insulation is bonded to the coil, the repetitive bending at points of least resistance results in repetitive stretching the adjacent rubber insulating material which can lead to tearing of the rubber, further reducing the localized resistance to bending and increasing the likelihood of premature failing. Tears and splits in the insulation also can expose the electrically conductive metal helix which can cause arcing, sparks and electrical shock to the operator.

The torch of the present invention represents an improvement over that disclosed in U.S. Pat. No. 4,145,595 in that it retains the inherent flexibility of a helix coil uninhibited by the presence of the insulating material without sacrificing the structural integrity or operability of the torch and without the need for costly tooling. The present invention also provides a second layer of thermal and electrical insulation for the torch to protect the operator. As a result, the present invention provides a safer and more flexible torch at a lower cost with an increased useful life.

SUMMARY OF THE INVENTION

Briefly, the present invention comprises a gas shielded welding torch of economical construction wherein the torch head can be readily positioned in any desired angular orientation relative to the torch handle to facilitate access to a work area. Such economical construction and flexibility is achieved through the use of a torch body which includes a flexible helix formed by a coil of an electrically conductive material electrically and structurally connecting the torch barrel with the torch head and providing a gas flow passage through the bore defined by the convolutions therein. A sealing tape formed of a heat insulating material is wrapped tightly about the helix to encase the helix therein and a generally cylindrical insulating body of an elastomeric insulating material is molded about the sealing tape and adjacent torch components. The sealing tape isolates the helix from the elastomeric body to allow flexing of the helix relatively uninhibited by the outer elastomeric body whereby the flexibility of the torch body is enhanced and the bending stresses in the helix are evenly distributed along the entire length thereof, avoiding localized stressing and work hardening in isolated areas of the helix. An additional layer of insulation about the metallic helix is readily provided and the costs of manufacturing a highly flexible gas shielded welding torch is reduced.

It is the principal object of the present invention to provide a welding torch of economical construction in which the angular orientation of the torch head relative to the torch handle can be readily varied to facilitate access to a work area.

It is another object of the present invention to provide a gas shielded welding torch having a flexible body portion in which the bending stresses therein can be evenly distributed along the length thereof to minimize localized stress in the torch body and thereby prolong the useful life of the torch.

It is yet another object of the present invention to provide a gas shielded welding torch of the type employing a flexible helix therein to electrically and structurally connect the torch head with the torch barrel which allows for the addition of a gas valve component thereto without significantly increasing the costs of manufacture.

These and other objects and advantages of the present invention will become readily apparently from the following detailed construction taken in conjunction with the accompanying drawings.

IN THE DRAWINGS

FIG. 1 is a cross sectional view of the welding torch of the present invention.

FIG. 2 is a partial sectional view of the torch of the present invention shown without the elastomeric body portion, torch handle and torch head components.

FIG. 3 is a partial sectional view of a portion of a second embodiment of the torch of the present invention provided with a gas flow regulating valve.

DESCRIPTION OF THE PREFERRED EMBODIMENT

Referring now in detail to the drawings, a welding torch 10 embodying the present invention is illustrated in FIG. 1. The torch shown thereon is air cooled and comprised of a torch head section 12 and torch handle section 14. Head section 12, which is of a conventional configuration, includes an internally threaded barrel 16 formed of copper or other highly conductive metal for retaining a tungsten electrode 18. Electrode 18 is coaxially supported with respect to barrel 16 by means of a collet formed by a tubular inner sleeve 20 having longitudinal slots therein to define spring fingers which clamp onto the electrode 18, the sleeve 20 being inserted within a collet body 22. The externally threaded rear end 22' of collet body 22 is received within the lower forward end of barrel 16. Collet body 22 is provided with a nose projection 24 having a circumferential array of apertures 26 therein to emit gas introduced into the angular space between sleeve 20 and collet body 22.

The forward end 22" of collet body 22 adjacent nose portion 24 is externally threaded to engage the internally threaded nozzle 28 formed of a temperature resistant ceramic material. The rearward end of nozzle 28 is tapered to nest within an insulating collar 30 having a complimentary taper that snaps onto the forward end of a cylindrical insulating jacket 32 surrounding barrel 16, jacket 32 being molded of an elastomeric material. A second insulating collar 34 snaps onto the rearward end of jacket 32. The tubular stem 36 of collet cap 38 into which the rear portion of electrode 18 is disposed extends through insulating collar 34 and threadably engages the rear end of the barrel 16. An "O"-ring seal 40 is disposed between insulating collet 34 and tubular stem 36.

The barrel 16 of the torch head section 12 is joined to the handle section 14 by means of a tubular coupler 42 formed of a highly conductive metal material which is brazed to barrel 16 and extends laterally therefrom at an angle thereto. Coupler 42 communicates with the interior of barrel 16 and is provided with a rear radial flange 44 which is brazed to the forward end of a helix 46 defined by a coil of solid wire formed of copper or other flexible metal or alloy of high conductivity and mechanical strength. The gage of the wire is appropriate to the intensity of the electric welding current for which the torch is designed and is preferably rectangular in cross section to provide more current carrying capacity, more heat dissipation and greater durability than a cylindrical wire of the same cross-sectional dimension.

The rearward end of helix 46 is brazed to the forward end of a highly conductive metal conduit 48. A cylindrical connector 50 formed of an electrically conductive material is brazed onto the rearward end of conduit 48 for connecting the torch to a source of welding current as well as to a pressurized source of inert gas. The outer diameter of connector 50 is greater than that of conduit 48 and connector 50 defines in its forward end an internal bore 50' equal in diameter to the internal diameter of conduit 48 which is substantially the same as coupler 42. The rear portion of connector 50 has a bore 50" of larger diameter which is externally threaded to accommodate a conventional cable coupler for the torch 10.

A heat-resistant sealing tape 52, preferably formed of silicone rubber, is wrapped tightly about helix 46 and proximate portions of tubular coupler 42 and conduit 48. Molded about coupler 42, sealing tape 52 and a portion of conduit 48 is a cylindrical body 54 formed of an elastomeric insulating material such as silicone rubber. Insulating body 54 is provided with a longitudinal bore 56 which joins coupler 42 to conduit 48 to define a gas flow conduit which extends from connector 50 through the central bore 47 of helix 46 to coupler 42 which in turn communicates with the interior barrel 16 to supply shielding gas thereto. The shielding gas is emanated from apertures 26 in the nose of the collet body 22 and projected through nozzle 28 to envelop the welding zone.

In fabricating the torch body, the subassembly shown in FIG. 2, comprising barrel 16, coupler 42, helix 46, conduit 48 and sealing tape 52, is placed in a mold into which a silicone rubber molding compound is injected to form the molded body 54, which body also surrounds the barrel 16 to define jacket 32 and adheres to its adjacent components of the subassembly. The rearward portion 54' of insulating body 54, which surrounds conduit 48 is provided with annular ribs 58 and defines a forward shoulder 60, is disposed within a tubular insulated handle 62, the forward end of which abuts shoulder 60.

Because sealing tape 52 surrounds and isolates the flexible helix 46, the silicone rubber of which body 54 is formed is prevented from entering the spaces between the individual convolutions of helix 46 during the body molding process. Accordingly, when the forward end of the torch body is bent to bring the torch head section 12 into the desired angular orientation with respect to handle 62 to access to the work area, the helix is free to move or flex in all directions as the rubber body 54 is neither bonded to nor disposed between the convolutions in the metal helix. The bending stresses can thus be evenly distributed along the entire length of the helix 46 to increase the flex life of the torch body. Sealing tape 52 additionally provides a second layer of thermal and electrical insulation for the metallic helix 46 for the protection of the operator.

FIG. 3 illustrates an alternate embodiment of the present invention in which a conventional gas flow regulating valve 70 is added to the torch body. To accommodate valve 70, a fitting 72, preferably constructed of copper, is disposed between and secured to the forward end of conduit 48 and the rearward end of helix 46. In the preferred embodiment of valve 70, fitting 72 defines a forward cylindrical portion 74 and a rearward tapered portion 76. Cylindrical portion 74 defines an axial bore 78 therein and a forward annular end wall 80 disposed about the open forward end of bore 78. An electrically conductive tubular coupler 82 defining a radial flange 84 thereon intermediary of its ends is disposed between and secured to fitting 72 and helix 46. Coupler 82 projects into the bore 47 of helix 46 and the forward end of flange 84 abuts and is brazed to the rearward end of helix 46. Coupler 82 also projects rearwardly into the bore 78 of fitting 72 and is brazed to fitting 72 so as to secure the fitting 72 to the helix. The rearward tapered portion 76 of fitting 72 also defines a bore 86 therein which is of the same diameter as bore 78, is axially aligned therewith and receives the forward end of the electrically conductive gas conduit 48. In this embodiment of the invention, conduit 48 defines a shoulder 88 therein which abuts the rearward end of fitting 72 where the fitting and conduit are brazed together. A threaded radial bore 90 is disposed in the cylindrical portion 74 of fitting 72 which terminates at its lower end in an annular conical bottom wall 92 disposed about a cylindrical recess 92. An inclined gas 95 flow passage of reduced diameter extends between the recess 94 at the bottom of the radial bore 90 in fitting 72 and the enlarged rear axial bore 86 therein and communicates conduit 48 with radial bore 90 adjacent the bottom wall 92 thereof. A second gas flow passage 96 of reduced diameter extends axially through the cylindrical forward portion of fitting 72 so as to communicate radial bore 90 via coupling 82 with the interior gas flow passageway 47 in the torch body defined by the interior of helix 46. To regulate the gas flow through radial bore 90 to the torch head section 12, a valve stem 98 is threadedly mounted in radial bore 90. Valve stem 98 is provided with a steel sealing ball 100 mounted in a recess in the lower end thereof, a sealing cap 102 secured to the upper end thereof and a sealing O-ring 104 disposed about stem 98 below knob 102 which prevents the escape of any gas about stem 98. Gas flow through valve 70 is simply regulated by rotating knob 102 to vary the spacing between sealing bearing 100 and the bottom annular wall 92 of bore 90.

It is significant to note that if the helix 46 were not isolated during the molding step by sealing tape 52 to prevent the elastomer material forming insulating body 54 from flowing between the helix convolutions, the inclusion of gas regulating valve 70 would obstruct the bore 47 of helix 46 so that a removable rod could not be employed therein to prevent the plugging of the helix bore 47 with the elastomeric material during the molding of body 54. Thus, the use of sealing tape 52 not only improves the flexibility of the torch and increases its life as previously described but also allows for a gas flow regulating valve such as valve 70 to be easily employed in the torch construction if desired.

While a silicone rubber sealing tape is employed in the preferred embodiment of the present invention to isolate the helix and provide additional insulation therefor, other materials and sealing means might also be employed. For example, a heat shrinkable pliable sleeve or a thin walled flexible tube mechanically sealed at its ends might be used to provide the isolation and insulation of the helix. Any such alternative sealing means, however, should be sufficiently flexible so as not to impair the flexibility of the helix. Various other changes and modifications may be made in carrying out the present invention. Insofar as such changes and modification are without the purview of the appended claims, they are to be considered as part of the present invention.

I claim:

1. In a gas shielded welding torch of the type having a head portion adapted to retain a tungsten electrode therein and a flexible handle portion which supplies electric current and inert gas to the head portion and includes a bendable metal helix of solid wire therein and a body of elastomeric insulating material molded about the helix, the improvement comprising: a flexible sealing means disposed about the helix and isolating the helix from the body of insulating material, said means preventing the intrusion of insulating material into the helix during the molding of the insulating body about the helix whereby uniform flexibility in the helix is obtained.

2. The improvement of claim 1 wherein said sealing means is comprised of a thermal and electrical insulating material.

3. The improvement of claim 1 wherein said sealing means is comprised of a plurality of wraps of insulating tape to provide additional thermal and electrical insulation about the helix.

4. The improvement of claim 3 wherein said tape is comprised of a silicon rubber material.

5. A method for improving the flexibility and thermal and electrical insulation in a gas shielded welding torch of the type having a head portion adapted to retain a tungsten electrode therein and a flexible handle portion which supplies electric current and inert gas to the head portion and includes a bendable metal helix therein and a body of elastomeric insulating material molded about the helix, said method comprising the step of isolating the helix within a flexible thermal and electrical insulating material prior to molding the elastomeric insulating body about the helix to prevent the intrusion of elastomeric insulating material into the helix during the molding of the body about the helix.

6. A method for improving the flexibility and thermal and electrical insulation in a gas shielded welding torch of the type having a head portion adapted to retain a tungsten electrode therein and a flexible handle portion which supplies electric current and inert gas to the head portion and includes a bendable metal helix therein and a body of elastomeric insulating material molded about the helix, said method comprising the step of wrapping a plurality of layers of insulating tape about the helix prior to molding the elastomeric insulating body about the helix to prevent the intrusion of elastomeric insulating material into the helix during the molding of the body about the helix.

* * * * *